April 3, 1934.  M. VOLPE  1,953,662
TROLLEY WHEEL SPINDLE
Filed Aug. 6, 1932
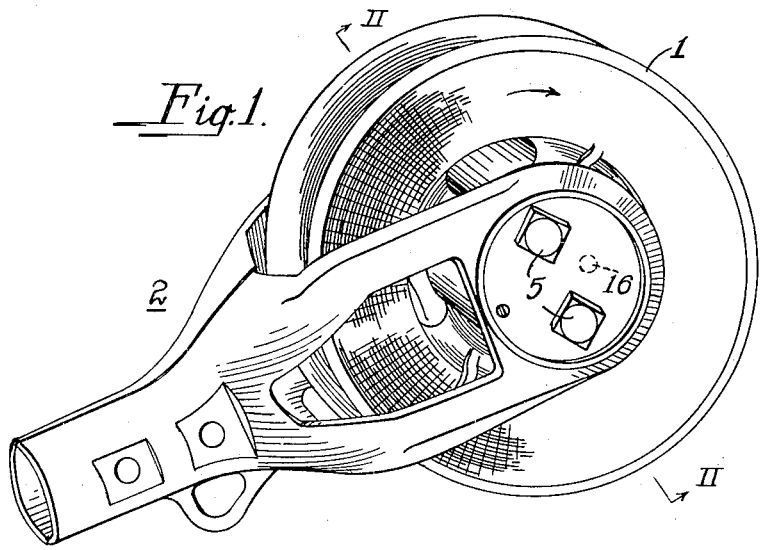
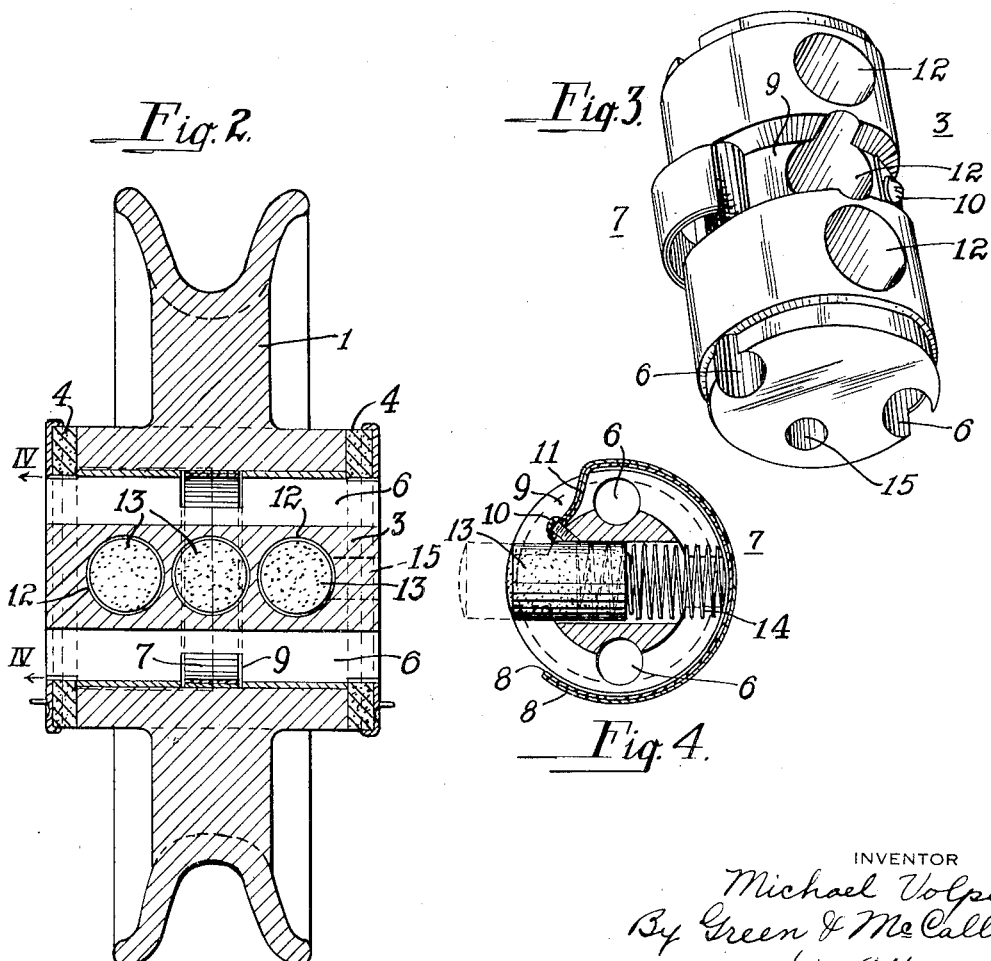
INVENTOR
Michael Volpe
By Green & McCallister
His Attorneys Patented Apr. 3, 1934

1,953,662

UNITED STATES PATENT OFFICE 1,953,662

TROLLEY WHEEL SPINDLE

Michael Volpe, Pittsburgh, Pa., assignor of one-half to Ernest G. Nassar, Pittsburgh, Pa.

Application August 6, 1932, Serial No. 627,760

7 Claims. (Cl. 191—61)

This invention relates to trolley wheels and more particularly to spindles or axles on which the wheels are mounted.

An object of this invention is the provision of a trolley wheel spindle that shall greatly increase the life of the wheel.

Another object of this invention is the provision of means for reducing, if not entirely preventing, arcing between the hub of a trolley wheel and its spindle so that the wheel and spindle will be subject only to mechanical wear such as results from friction.

Another object of the invention is the provision of an improved shunt that may be applied to standard spindles now in use, so that it will not be necessary to change the design of either the wheel or the hub.

Other objects of the invention will, in part, be apparent, and will, in part, be obvious from the following description taken in conjunction with the accompanying drawing in which:

Figure 1 is a view in perspective of a trolley wheel and harp of standard design, to which a spindle or axle embodying the invention may be applied;

Fig. 2 is a view in section taken on line II—II of Fig. 1, (the harp being removed) showing the spindle embodying the invention disposed in operative relation to the hub of the wheel and the lubricating rings disposed at the opposite sides of the hub.

Fig. 3 is a view in perspective of the spindle embodying the invention; and

Fig. 4 is a view of the spindle in transverse section taken on line IV—IV of Fig. 2.

Throughout the drawing and specification like reference characters indicate like parts.

In Fig. 1 of the drawing a trolley wheel 1 and harp 2 are shown. The wheel is mounted on a spindle 3 as shown in Fig. 2. Lubricator rings 4 are disposed over the end of the spindle and engage the opposite ends of the wheel hub. These rings and the ends of the spindle are clamped positively between the harp and the hub by means of bolts 5 that extend longitudinally through the spindle. The spindle is thus stationary relative to the wheel and conductively coupled to the harp. Current which flows from the trolley wire, not shown, is conveyed from the hub of the wheel to the spindle and thence to the harp. The harp, it will be understood, carries the current to the trolley pole, (not shown) to which the apparatus of a car, (not shown), is connected.

The wheel, harp and lubricating rings above described, are standard equipment, the spindle constituting the improvement embodying the invention.

The spindle is designed to prevent arcing between the bore of the hub and the spindle, and thereby increase the life of the wheel and spindle.

When a trolley wheel is in operation one side of the spindle is subject to high bearing pressures and wear. As the wheel and spindle wear, the clearance therebetween increases, so that arcs are drawn from the wheel hub to the spindle. These arcs are usually drawn as the result of variations in pressure between the trolley wire and wheel. Such arcing causes the spindle and hub to pit and burn, with the result that the friction surface becomes rough and shortens the life of both spindle and wheel.

With spindles of the design herein disclosed, arcing between the spindle and hub is reduced, if not entirely prevented, so that the friction surfaces will remain smooth and clean. The spindle, in general design, is the same as certain known prior art spindles, and is interchangeable therewith so that it may be used with existing equipment without redesigning either the wheel, harp or lubricating rings above described.

The spindle may be made from round stock machined to the proper diameter and cut to the proper length. Holes 6 are drilled longitudinally of the spindle, at diametrically opposite sides, to accommodate the bolts 5. The ends of the spindle are reduced in diameter so that the collector rings may slip over the same as shown in Fig. 2, and permit positive engagement between the ends of the spindle and the harp.

In order to prevent arcing between the spindle and the bore of the wheel hub, a shunt 7 is provided and yieldingly mounted on the spindle. The shunt comprises one or more curved resilient strips 8 of metal having high current conductivity, such as spring bronze. These strips are preformed to conform generally to the contour of the hub bore.

In order to accommodate the shunt, it is preferred to form a groove 9 in the central part of the spindle, and anchor one end of the shunt in the bottom of the groove. As shown the shunt is anchored by means of a screw 10 threaded into the spindle.

As may be seen more clearly in Fig. 4, the anchored end of the shunt is bent as at 11 so that the major portion of the shunt tends to be urged out of the groove. When the spindle is removed from the hub the unrestrained portion of the shunt springs out of the groove and lies along the circumference of a circle of larger diameter than the diameter of the spindle. Thus when the spindle is mounted in the hub, the shunt will be yieldingly urged into contact with the hub bore. The width and length of the shunt are made such that the current conducting surface between the shunt and hub will be ample.

In order that the spindle and the hub may be adequately lubricated, a plurality of holes 12 are drilled transversely of the longitudinal axis of the spindle preferably from one side to simplify the drilling operation. Into these holes cylindrical members 13 consisting chiefly of graphite, which is a good lubricating material, are placed. These cylindrical members of graphite are backed by compression springs 14.

The middle hole is drilled centrally of groove 9 so that the graphite member therein may lubricate the surface of the hub bore which is traversed by and in contact with the shunt.

By mounting one of the lubricating members and its spring in a hole passing through the spindle at the groove, the spring tends to urge the shunt into contact with the hub. Thus the resiliency of the shunt and the pressure exerted by the spring thereon are utilized to maintain the shunt in good electrical contact with the hub.

When mounting the spindle in the hub of the wheel, the spindle is so placed that the free end of the shunt points in the direction of rotation of the wheel. This direction is indicated by the arrow in Fig. 1. By mounting the spindle in this manner, jamming or buckling of the shunt is avoided.

In order to make sure that the spindle will always be mounted in the proper manner, one end of the spindle is provided with a hole 15 which is adapted to register with a pin 16 formed in one-half of the harp. The other half of the harp, being not provided with such a pin, the spindle can be mounted only in the proper manner within the hub.

The spindle, herein shown, carries current from the hub of the trolley wheel into the spindle and then to the harp, the harp being in good contact with the ends of the spindle. Since the shunt is always maintained in firm, positive engagement with the bore of the hub, arcing from the hub to the spindle is avoided even though the spindle may wear.

Since the shunt is at all times yieldingly urged against the bore of the hub, at the central part thereof, the shunt may tend to wear a slight groove therein. Such a groove may prove beneficial in that it will tend to centralize the wheel with respect to the spindle.

The yieldable or cushion-like pressure established between the hub and spindle by the shunt and the springs 14 acting on members 13, tends to hold the wheel in a fixed central position relative to the spindle, thereby counteracting the tendency for the wheel to chatter and vibrate, which is a common fault with prior art spindles and wheels.

While but one form of the invention has been shown and described herein, it will be appreciated by those skilled in this particular art that various modifications and changes may be made without departing either from the spirit or the scope of the invention. It is desired, therefore, that only such limitations shall be placed on the invention as are imposed by the prior art and the appended claims.

What I claim as new and desire to secure by Letters Patent is:

1. A spindle, for current collector wheels, provided with a circumferential groove and having a shunt of yieldable material disposed in the groove and rigidly secured to the spindle at one point so that the unsecured portions of the shunt are free to yieldingly engage the bore surface of the hub embracing the spindle.

2. A spindle, for current collector wheels, provided with a circumferential groove and having a shunt disposed in the groove and rigidly secured to the spindle at one point, said shunt comprising a strip of resilient current conducting material of such length as to substantially embrace the spindle and of such shape that when the spindle is inserted in the bore of the hub of a wheel, said strip is deflected to conform to the bore surface of the hub and to yieldingly engage substantially the entire surface of the hub bore that is concentric with the groove in the spindle.

3. A mounting for current collector wheels comprising a spindle, adapted to be received in the bore of the hub of a wheel, said spindle having a circumferential groove therein, and a curved resilient strip of current conducting material, having one end rigidly anchored in said groove, adapted to substantially encircle the spindle and yieldingly engage the bore surface of the hub.

4. A spindle for current collector wheels having a shunt yieldingly mounted on the spindle and adapted to yieldingly engage the bore surface of the hub embracing the spindle, said spindle having a transverse bore therein, a lubricating member in said bore, and a spring interposed between the shunt and lubricating member adapted to yieldingly urge the shunt and lubricating member into positive engagement with the bore surface of the hub.

5. The combination with a current collector wheel having a bore in its hub, a spindle in the bore, a harp, and means securing the spindle to the harp, said spindle having a circumferential groove therein, of current conducting means anchored in said groove and adapted to yieldingly engage the bore of the hub and thereby conduct current from the wheel to the spindle, and to minimize chattering and vibration between the spindle and wheel.

6. A spindle, for current collector wheels, having a circumferential groove and a shunt rigidly secured at one point to the bottom of the groove, said shunt comprising superposed curved strips of resilient current conducting material adapted to substantially embrace the spindle, the curvature of said strips being such that they are urged outwardly of the groove so that one of said strips is maintained in contact with the bore surface of a wheel hub when mounted in place on the spindle.

7. The combination with a current collector wheel having a bore in its hub, a spindle in the bore, a harp, and means securing the spindle to the harp, said spindle having a circumferential groove therein, means comprising a curved resilient strip of current conducting material having one end secured in said groove, said strip substantially encircling the spindle and being provided with sufficient spring to normally engage the bore of the hub and thereby conduct current from the wheel to the spindle, and to minimize chattering and vibration between the spindle and wheel.

MICHAEL VOLPE.